United States Patent
Balasubramaniam et al.

(10) Patent No.: US 9,510,214 B1
(45) Date of Patent: Nov. 29, 2016

(54) ACTIVATING, CONFIGURING, AND MONITORING CLOUD-BASED WI-FI SERVICES

(71) Applicant: wildfire.exchange, inc., San Francisco, CA (US)

(72) Inventors: Dhanalakshmi Balasubramaniam, Palo Alto, CA (US); Vikas Butaney, Los Altos, CA (US); Martin J. Lord, Saratoga, CA (US)

(73) Assignee: wildfire.exchange, inc., San Francisco, CA (US)

( * ) Notice: Subject to any disclaimer, the term of this patent is extended or adjusted under 35 U.S.C. 154(b) by 11 days.

(21) Appl. No.: 14/523,820

(22) Filed: Oct. 24, 2014

Related U.S. Application Data

(60) Provisional application No. 61/895,977, filed on Oct. 25, 2013.

(51) Int. Cl.
| | |
|---|---|
| *G06F 11/00* | (2006.01) |
| *H04J 1/16* | (2006.01) |
| *H04J 3/14* | (2006.01) |
| *H04L 12/26* | (2006.01) |
| *H04W 24/02* | (2009.01) |
| *H04M 15/00* | (2006.01) |
| *H04W 84/12* | (2009.01) |

(52) U.S. Cl.
CPC .............. *H04W 24/02* (2013.01); *H04M 15/51* (2013.01); *H04W 84/12* (2013.01)

(58) Field of Classification Search
CPC .... H04W 24/02; H04W 84/12; H04M 15/51

USPC ................. 370/252, 253, 254, 338
See application file for complete search history.

(56) References Cited

U.S. PATENT DOCUMENTS

| | | | | |
|---|---|---|---|---|
| 8,543,673 | B2* | 9/2013 | Calippe | H04L 41/0843 709/221 |
| 2013/0235749 | A1* | 9/2013 | Cho | G01S 5/0252 370/252 |
| 2014/0071942 | A1* | 3/2014 | Ye | H04W 36/22 370/331 |
| 2016/0112728 | A1* | 4/2016 | Kaushik | H04N 21/2385 725/116 |
| 2016/0255010 | A1* | 9/2016 | Shukla | H04L 47/27 |
| 2016/0255538 | A1* | 9/2016 | Savarimuthu | H04W 28/08 |

\* cited by examiner

*Primary Examiner* — Chuong T Ho
(74) *Attorney, Agent, or Firm* — Clements Bernard PLLC; Lawrence A. Baratta, Jr.; Christopher L. Bernard

(57) ABSTRACT

A method of activating and configuring an access point (AP) located at a location of a customer of an entity is disclosed. A first communication from the AP is received by a cloud-based Wi-Fi service manager, wherein the first communication includes a first unique identifier for the AP. A second communication from an administrator of the entity is received by the cloud-based Wi-Fi service manager, wherein the second communication includes a second unique identifier for the AP and an identifier for the customer of the entity. The AP is associated with the customer by the cloud-based Wi-Fi service manager. Configuration information for the customer is retrieved by the cloud-based Wi-Fi service manager. The configuration information is sent to the AP by the cloud-based Wi-Fi service manager, wherein the configuration information is used by the AP for configuration.

28 Claims, 15 Drawing Sheets

US 9,510,214 B1

ACTIVATING, CONFIGURING, AND MONITORING CLOUD-BASED WI-FI SERVICES

CROSS REFERENCE TO OTHER APPLICATIONS

This application claims priority to U.S. Provisional Patent Application No. 61/895,977 entitled CLOUD-BASED MOBILE WI-FI SERVICE ENABLER FOR PROVISIONING, MONITORING, AND OPTIMIZATION WIRELESS ACCESS filed Oct. 25, 2013 which is incorporated herein by reference for all purposes.

BACKGROUND OF THE INVENTION

Traditionally, APs are attached to a wired network and managed by a Wi-Fi network controller, which may handle automatic adjustments to RF power, channel assignment, authentication, security, and the like. The APs are managed locally by a Wi-Fi network controller, and both the APs and the Wi-Fi network controller are connected to the Internet behind a Network Address Translation (NAT) firewall. This traditional system has a number of drawbacks. For example, the APs and the Wi-Fi network controller must be purchased from the same vendor. In addition, the Wi-Fi network controller must be deployed on the premises behind the NAT firewall.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
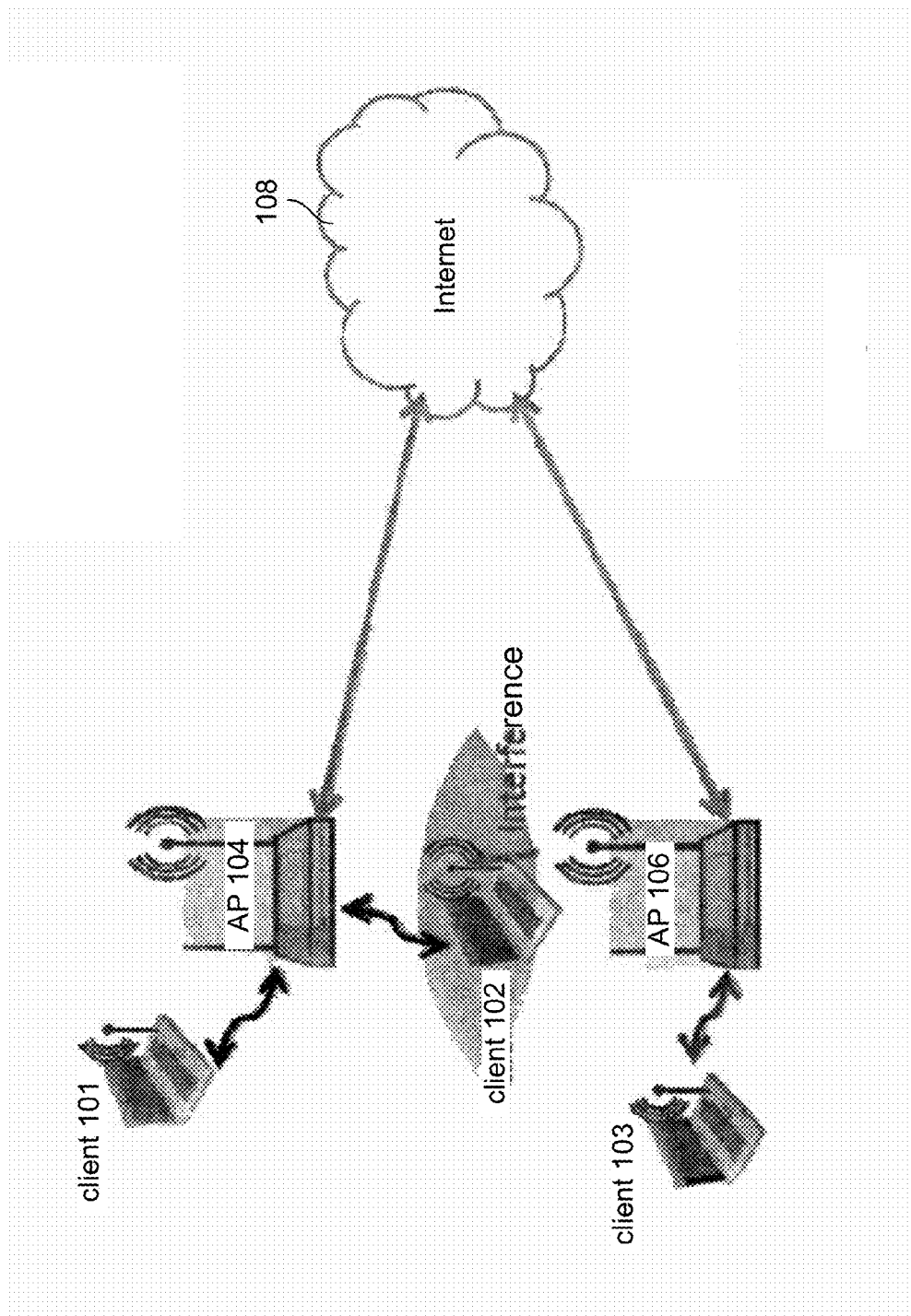
FIG. 1 illustrates a Wi-Fi network in which a Wi-Fi-enabled client (client 101, client 102, or client 103) may connect to any authorized AP (104 or 106) when the client is within the AP's coverage area.

Wi-Fi networks are formed using one or more Wi-Fi access points (APs), which can be deployed in homes, apartments, office buildings, and as outdoor hotspots. FIG. 1 illustrates a Wi-Fi network in which a Wi-Fi-enabled client (client 101, client 102, or client 103) may connect to any authorized AP (104 or 106) when the client is within the AP's coverage area. The APs are connected to the backbone Internet 108, with traffic routed to and from their clients via standard Internet protocols.

Figure 2:
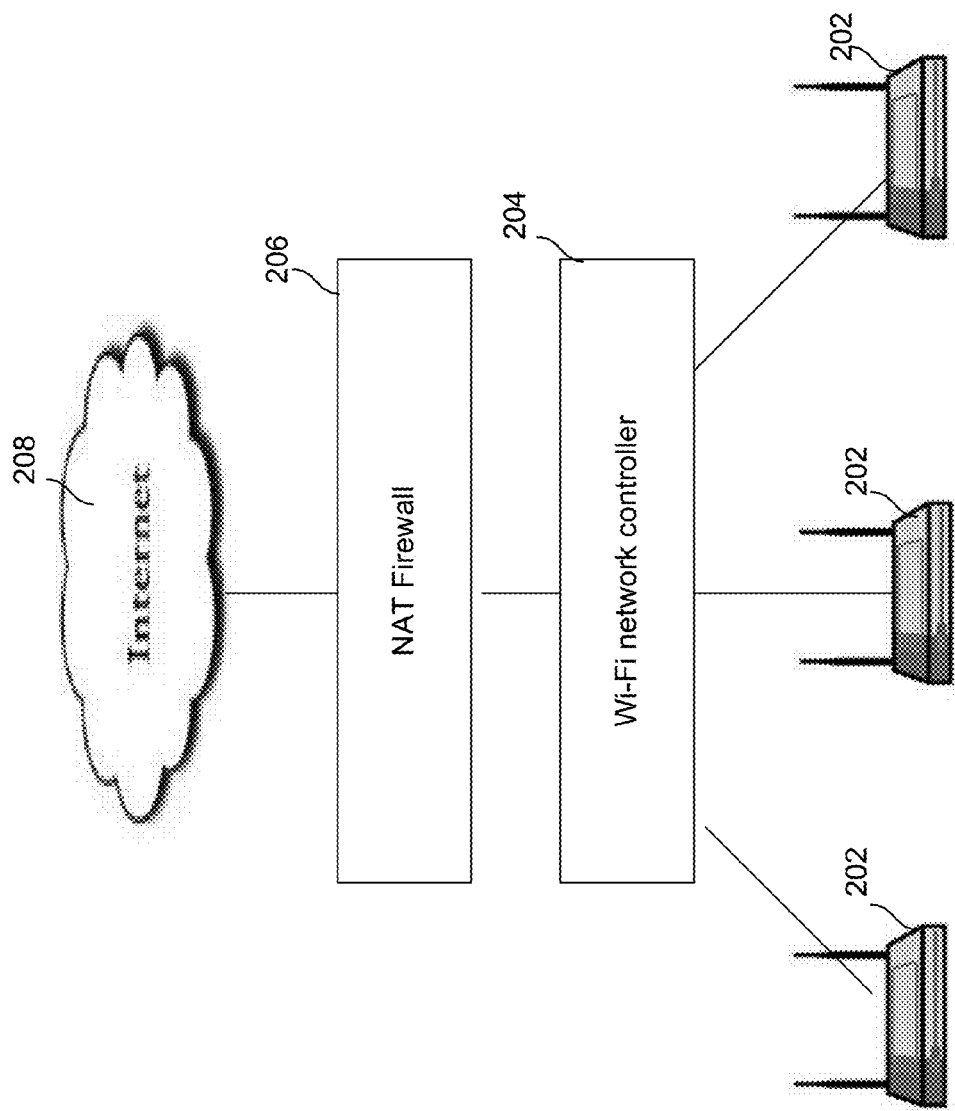
FIG. 2 illustrates an embodiment of a plurality of APs that are managed by a Wi-Fi-network controller.

Traditionally, APs are attached to a wired network and managed by a Wi-Fi network controller, which may handle automatic adjustments to RF power, channel assignment, authentication, security, and the like. FIG. 2 illustrates an embodiment of a plurality of APs that are managed by a Wi-Fi-network controller. As shown in FIG. 2, the APs 202 are managed locally by a Wi-Fi network controller 204, and both the APs 202 and Wi-Fi network controller 204 are connected to the Internet 208 behind a Network Address Translation (NAT) firewall 206. The system as shown in FIG. 2 has a number of drawbacks. For example, APs 202 and Wi-Fi network controller 204 must be purchased from the same vendor. In addition, Wi-Fi network controller 204 must be deployed on the premises behind NAT firewall 206.

Figure 3:
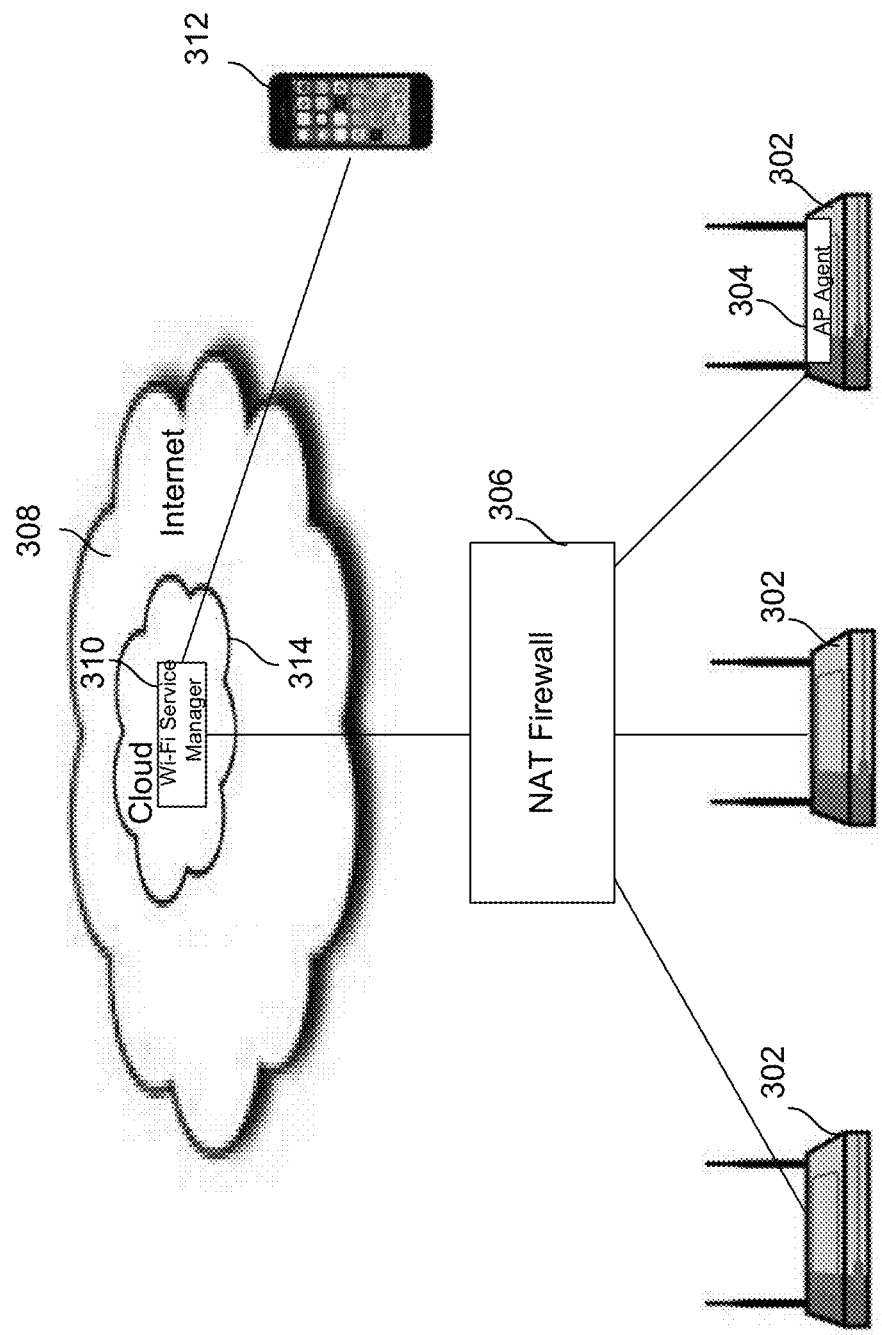
FIG. 3 illustrates an embodiment of a plurality of APs that are managed by a cloud-based Wi-Fi service manager, wherein the Wi-Fi service may be activated, configured, and monitored by a user using a user interface provided by an application (e.g., a mobile application or web browser) running on a mobile device.

FIG. 3 illustrates an embodiment of a plurality of APs that are managed by a cloud-based Wi-Fi service manager, wherein the Wi-Fi service may be activated, configured, and monitored by a user using a user interface accessible by an application (e.g., a mobile application or web browser) running on a mobile device. As shown in FIG. 3, a cloud-based AP agent 304 is installed on each of the APs 302. APs 302 are managed by a cloud-based Wi-Fi service manager 310 that is deployed in a cloud 314. A user may use an application running on a mobile device 312 to activate, configure, and monitor APs 302 remotely through the Internet 308 via the Wi-Fi service manager.

The system in FIG. 3 has a number of advantages. As will be described in greater detail below, the APs 302 that are managed by cloud-based Wi-Fi service manager 310 are not limited to APs offered by a single vendor, but can be APs that are offered by any third party vendor. In addition, APs 302 do not need to be managed locally by a manager or controller that is deployed on-premise behind a NAT firewall. Instead, APs 302 can be managed by a cloud-based Wi-Fi service manger 310 deployed in a cloud 310 external to a NAT Firewall 306. Furthermore, the Wi-Fi service may be activated, configured, and monitored remotely through a mobile device by a human user, such as an IT (information technology) administrator.

The user interface accessible by the application (e.g., a mobile application or web browser) running on a mobile device for activating, configuring, and monitoring the Wi-Fi service via Wi-Fi service manager 310 is referred to as a Wi-Fi service dashboard. The Wi-Fi service dashboard may be used by IT administrators of different entities. One entity type includes individual homes, companies, or organizations. In individual homes, companies, or organizations, the IT administrators are the home owners, company IT administrators, and IT administrators of the organizations, respectively. Another type of entity includes value-added resellers (VARs). A VAR is a company that adds features or services to an existing product, then resells the product (e.g., resells to end-users) as an integrated product or complete "turn-key" solution. For example, a VAR may purchase APs and build a fully operational Wi-Fi network, and customers who lack the time or experience to maintain the equipment and the network themselves (e.g., small offices or organizations) may subscribe to the VAR's service. Another type of entity includes value-added distributors (VADs). In addition to pick and pack services, a VAD offers programs and services that add value to the distributed products, thereby increasing their value or worth. The value addition can be segmented into different areas, including pre-sale, support of the sale, and post-sale.

The Wi-Fi service dashboard allows the IT administrator of a particular entity to activate, configure, and monitor the APs that belong to the entity. For example, two users from two separate households may log on to the Wi-Fi service dashboard independently, and each can access the APs that belong to his/her own entity, i.e., his/her own home. In another example, the IT administrator of two VARs may log on to the Wi-Fi service dashboard independently and each IT administrator can access the APs that belong to each of the corresponding VAR's customers.

Figure 4:
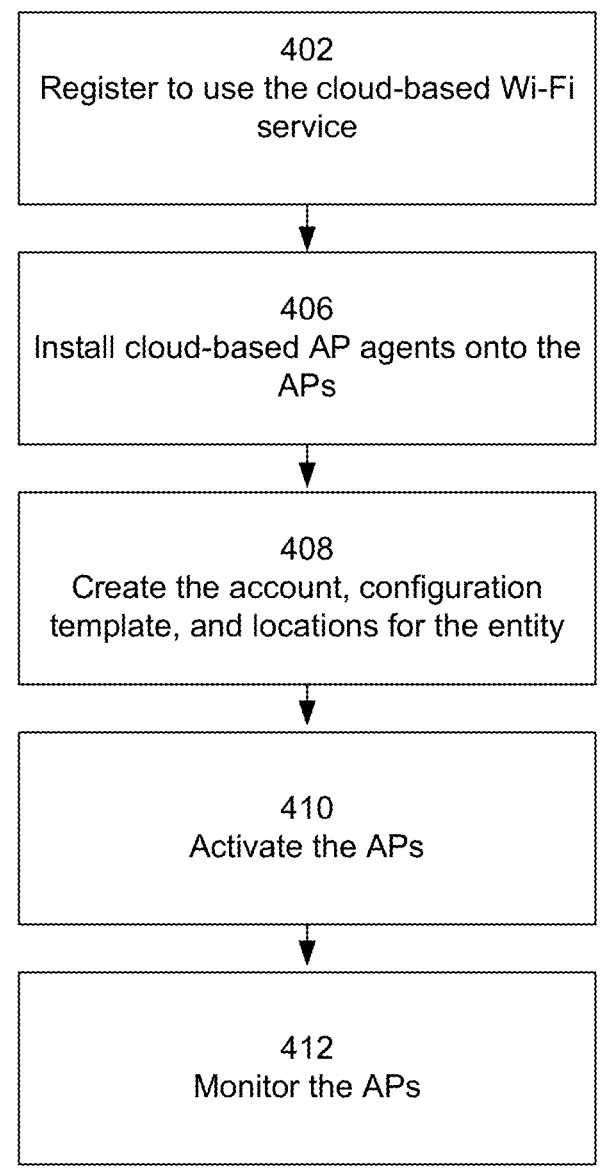
FIG. 4 illustrates an embodiment of a process 400 to set up Wi-Fi services that are managed by a cloud-based Wi-Fi service manager.

FIG. 4 illustrates an embodiment of a process 400 to set up Wi-Fi services that are managed by a cloud-based Wi-Fi service manager. At 402, an entity registers to use or re-sell the cloud-based Wi-Fi service. The entities may include individuals, companies or organizations, VARs, and VADs. For example, an end-user of a home entity may register to use the cloud-based Wi-Fi service directly. In another example, an IT administrator of a company or organization may register to use the cloud-based Wi-Fi service, and APs may be deployed in one or more locations belonging to the company or organization. In yet another example, an IT administrator of a VAR may register to re-sell the cloud-based Wi-Fi service, and APs may be deployed in one or more locations that belong to each of the VAR's customers.

Figure 5:
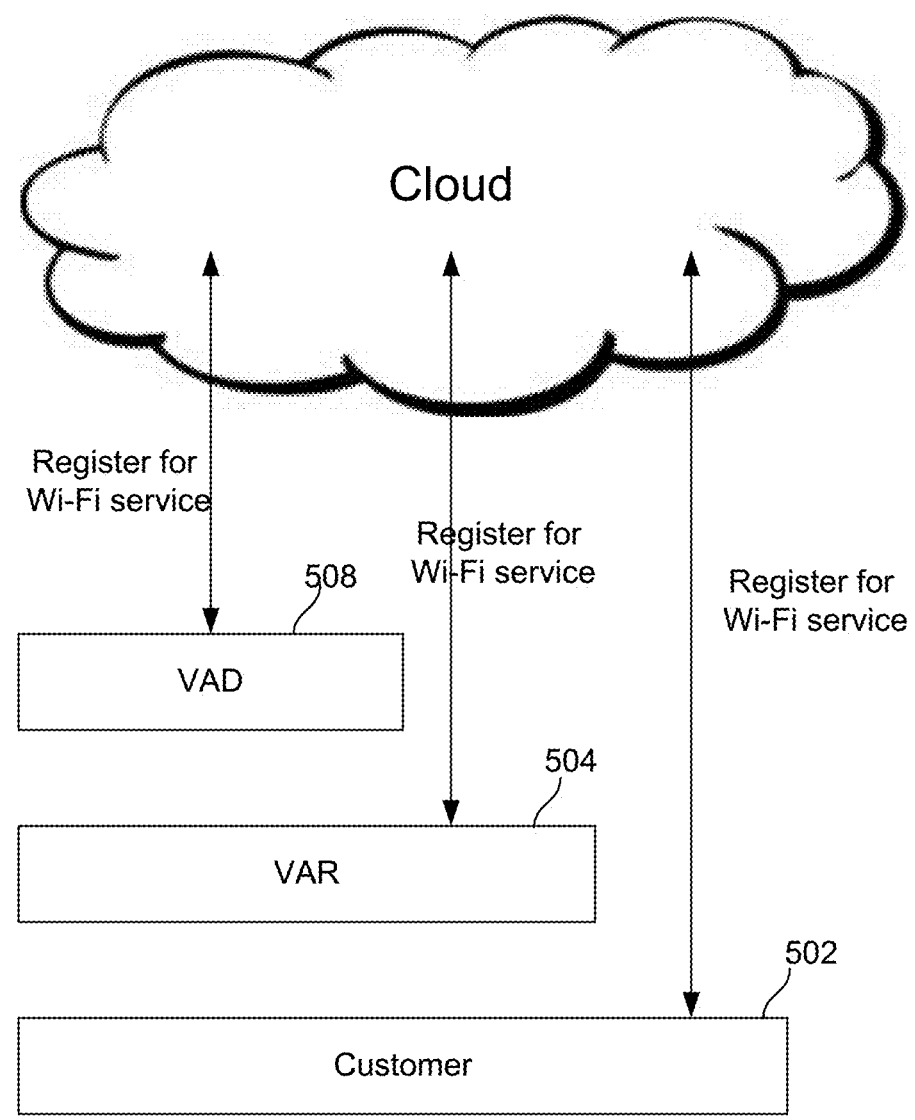
FIG. 5 illustrates that different types of entities may register to use or re-sell the cloud-based Wi-Fi service.

FIG. 5 illustrates that different types of entities may register to use or re-sell the cloud-based Wi-Fi service. As shown in FIG. 5, the registering process provides multi-tier support. At a first tier 502, individuals, companies, or organizations may register directly to use the cloud-based Wi-Fi service. At the second tier 504, customers (e.g., individuals, small businesses, or small organizations) may order their services through a VAR, and the VAR registers to re-sell the cloud-based Wi-Fi service to its customers. At the third tier 506, a VAD registers to re-sell the cloud-based Wi-Fi service to its customers.

With continued reference to FIG. 4, at 406, cloud-based AP agents are installed onto the APs that are to be deployed in the one or more locations of the entity. A cloud-based AP agent may be installed onto an AP by an end-user who purchases the third-party AP off the shelf. For example, the end-user may download a cloud-based AP agent from a website and install the agent onto the AP himself. The cloud-based AP agent may also be compiled into the firmware distribution by a VAR or VAD.

Figure 6:
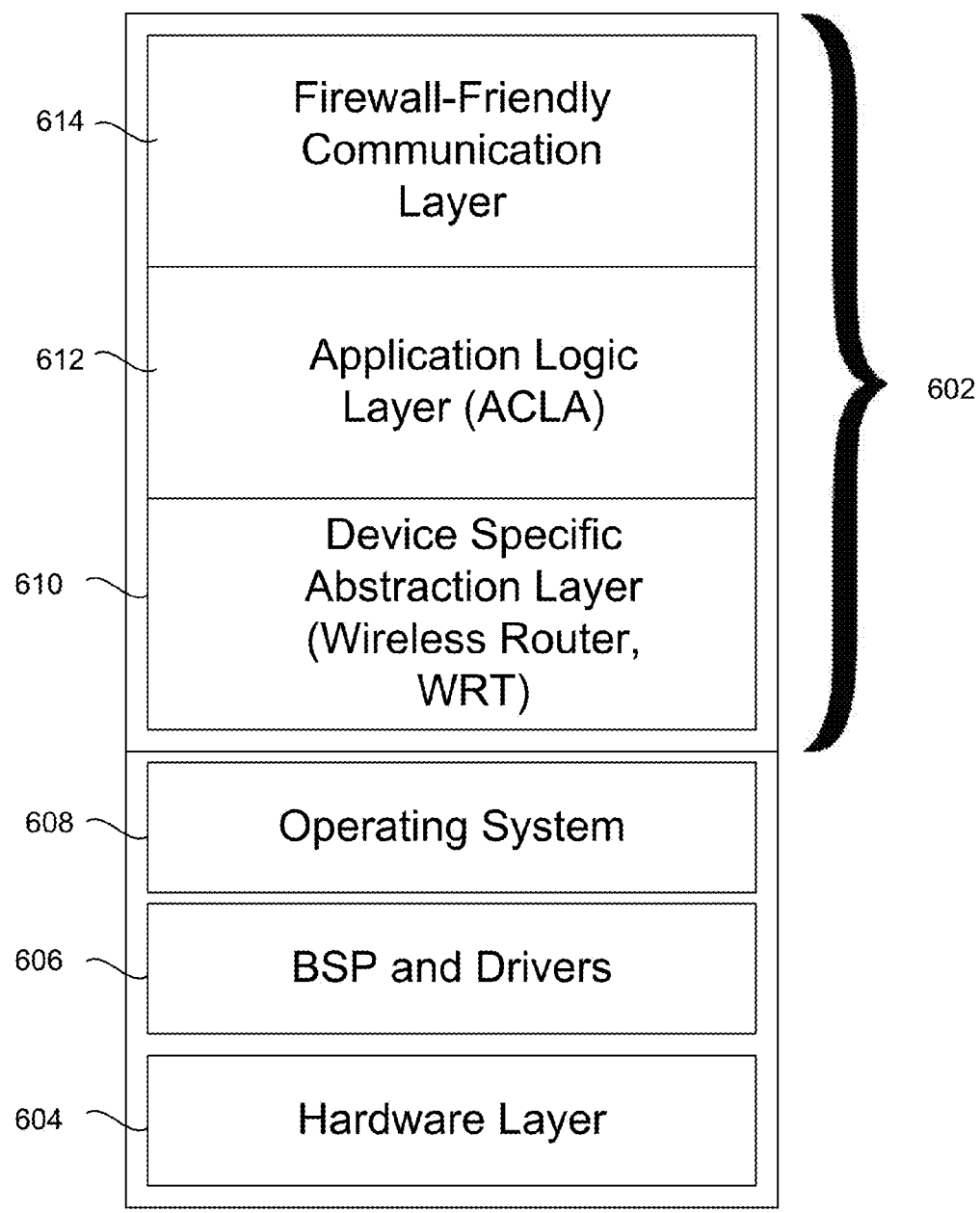
FIG. 6 illustrates an embodiment of a cloud-based AP agent installed on a third party AP.

FIG. 6 illustrates an embodiment of a cloud-based AP agent installed on a third party AP. Before the installation of the cloud-based AP agent firmware, the third party AP includes a number of layers and components, including a hardware layer 604, a board support package (BSP) and drivers 606, and an operating system (OS) 608. A cloud-based AP agent 602 is installed on top of the above-mentioned layers and components of the third party AP.

Cloud-based AP agent 602 includes a device specific abstraction layer 610, an application logic layer (ACLA) 612 and a firewall-friendly communication layer 614. Device specific abstraction layer 610 is hardware and firmware dependent, while application logic layer 612 and firewall-friendly communication layer 614 are hardware and firmware independent. Because cloud-based AP agent 602 needs to be compatible with third-party APs, it includes a device specific abstraction layer 610 to interface with the hardware and firmware of the different types of third-party APs. For example, device specific abstraction layer 610 includes interfaces to the specific AP's monitoring and configuration parameters. In addition, device specific abstraction layer 610 is an abstraction layer that hides the hardware and firmware differences from the upper layers, including application logic layer 612 and firewall-friendly communication layer 614. Therefore, the logic included in application logic layer 612 and firewall-friendly communication layer 614 can stay unchanged irrespective of the different hardware and firmware layers used by different third party AP vendors.

Application logic layer 612 includes logic for statistics reporting and configuration. Firewall-friendly communication layer 614 maintains secured and authenticated connections with cloud-based Wi-Fi service manger 310. Firewall-friendly communication layer 614, unlike other protocols, allows not only data and information to be transferred from cloud-based AP agent 602 out of a NAT firewall, but also allows configuration parameters and control information to be pushed from cloud-based Wi-Fi service manager 310 down to cloud-based AP agent 602, even when cloud-based AP agent 602 is located behind a NAT firewall. One example of a firewall-friendly communication layer is the Extensible Messaging and Presence Protocol (XMPP). However, other firewall-friendly communication layer may be used as well.

With continued reference to FIG. 4, at 408, the IT administrator or the end-user of the entity logs onto the Wi-Fi service dashboard (e.g., www.dashboard.acceleramb.com) to create an account for a customer and input the locations and the configuration templates for the customer. For example, the IT administrator of a VAR may create an account for a new customer, such as a public school district. After the account for the public school district is created, the IT administrator may configure a plurality of locations corresponding to the customer. For example, the locations may include a plurality of elementary schools within the public school district. The IT administrator may then configure the configuration templates for the various locations of the customer. For example, each of the configuration templates may include a plurality of configuration parameters for each of the locations. In another example, the IT administrator of a small company may create an account for the small company itself. In this case, the customer is the entity itself. After the account for the small company is created, the IT administrator may configure a plurality of locations corresponding to the small company. For example, the locations may include a plurality of company campuses. The IT administrator may then configure the configuration templates for the various locations of the small company. For example, each of the configuration templates may include a plurality of configuration parameters for each of the locations.

Figure 7:
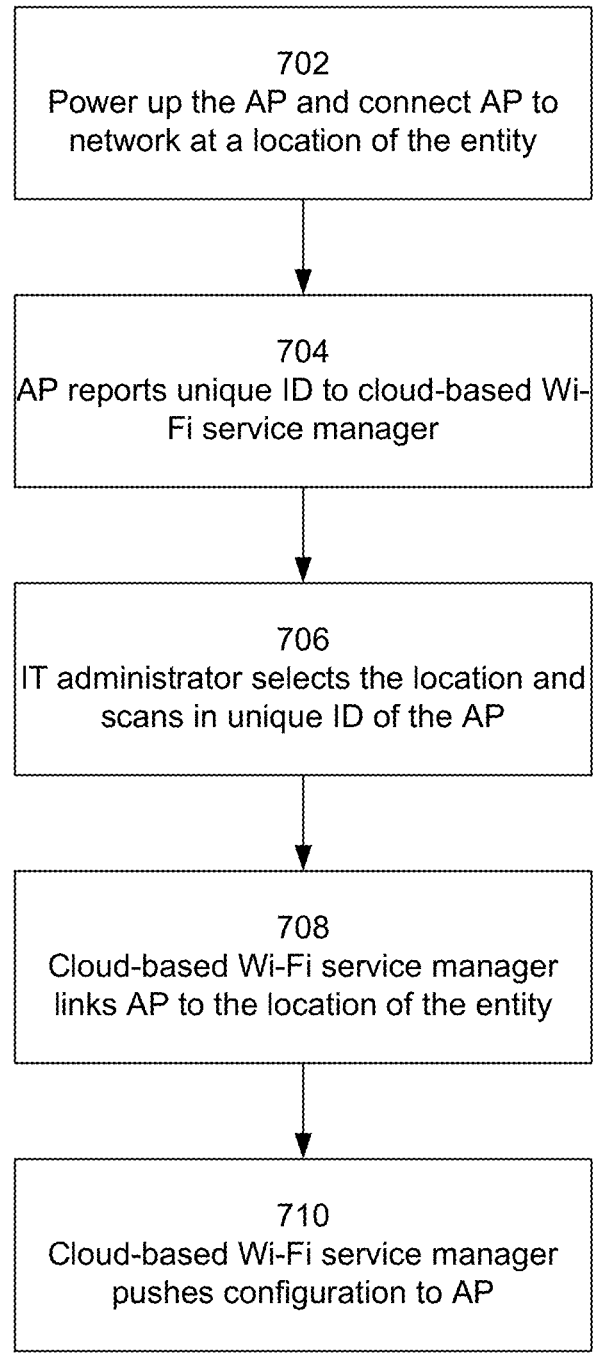
FIG. 7 illustrates an embodiment of a process 700 for activating an AP at a location of the entity.

At 410, the IT administrator or the end-user of the entity goes to each of the locations of the entity to activate the APs using the Wi-Fi service dashboard. FIG. 7 illustrates an embodiment of a process 700 for activating an AP at a location of the entity.

As shown in FIG. 7, at 702, the IT administrator goes to a location of the entity, powers up the AP and connects the AP to a network. For example, the IT administrator of the VAR installing the APs for the public school district may go to one of the elementary schools in the district, power up the AP and connect the AP to a network, e.g., an Ethernet network.

At 704, the AP automatically initiates a call to cloud-based Wi-Fi service manager 310 and establishes a communication session with cloud-based Wi-Fi service manager 310 via XMPP or another firewall-friendly communication protocol. Wi-Fi AP agent reports to cloud-based Wi-Fi service manager 310, which may include sending a set of information of the AP to cloud-based Wi-Fi service manager 310 via the established communication session. In some embodiments, the set of information includes a unique identifier of the AP, such as the Universal Product Code (UPC), the manufacturer's serial number (MSN), or the media access control (MAC) address of the AP. The unique identifier of the AP may be stored in a database by Wi-Fi service manager 310.

Figure 8:
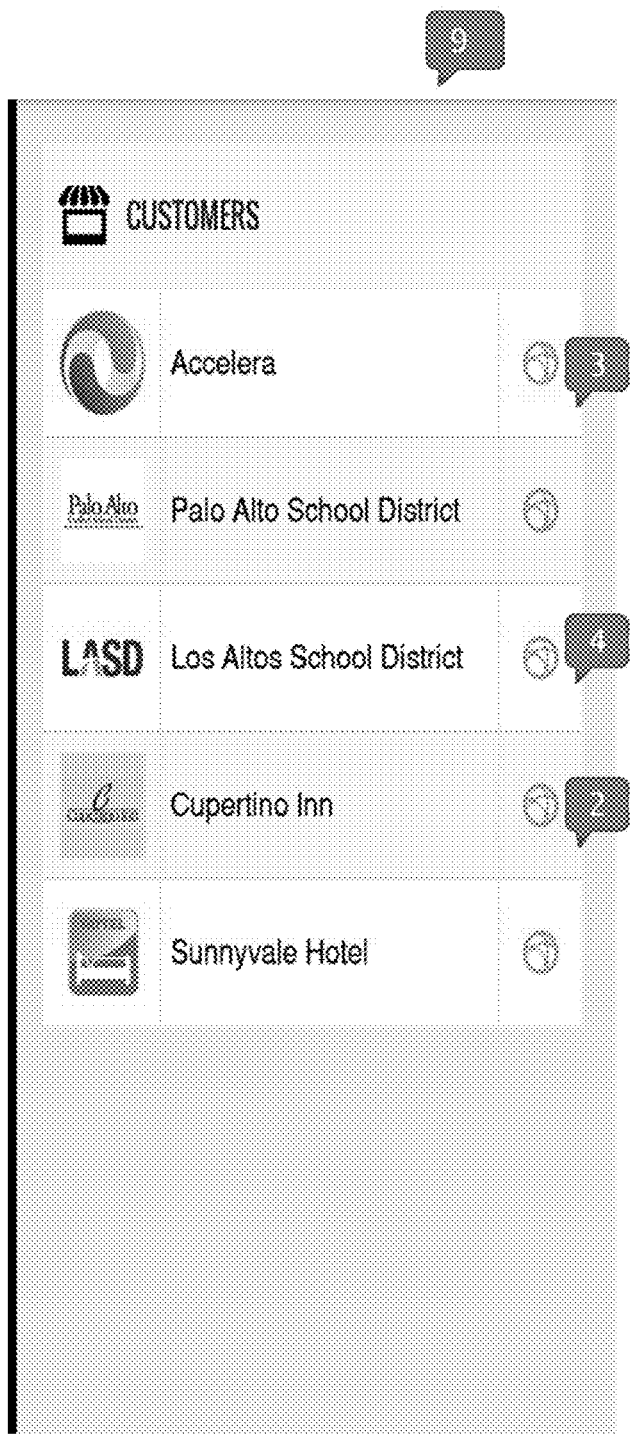
FIG. 8 illustrates an embodiment of a screenshot of the Wi-Fi service dashboard when the IT administrator is browsing at various customers of the VAR.
Figure 9:
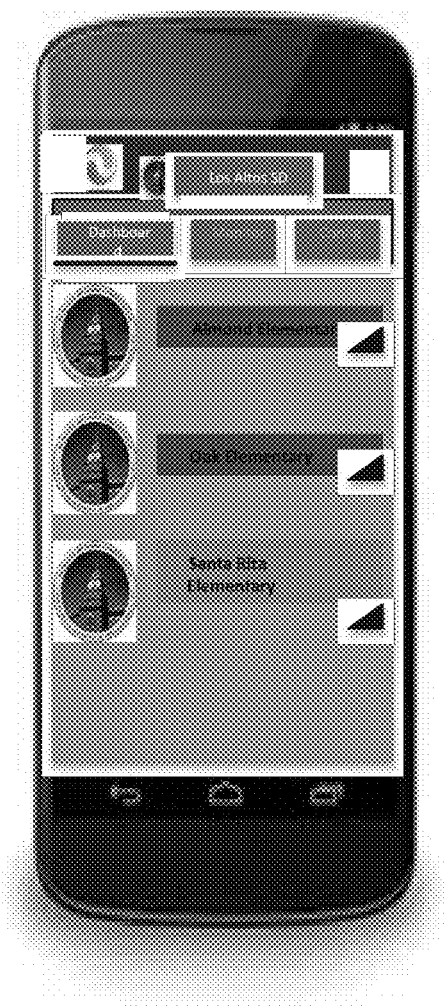
FIG. 9 illustrates an embodiment of a screenshot of the Wi-Fi service dashboard when the IT administrator navigates to a page displaying the various locations of one of the VAR's customers, Los Altos School District (LASD).
Figure 10:
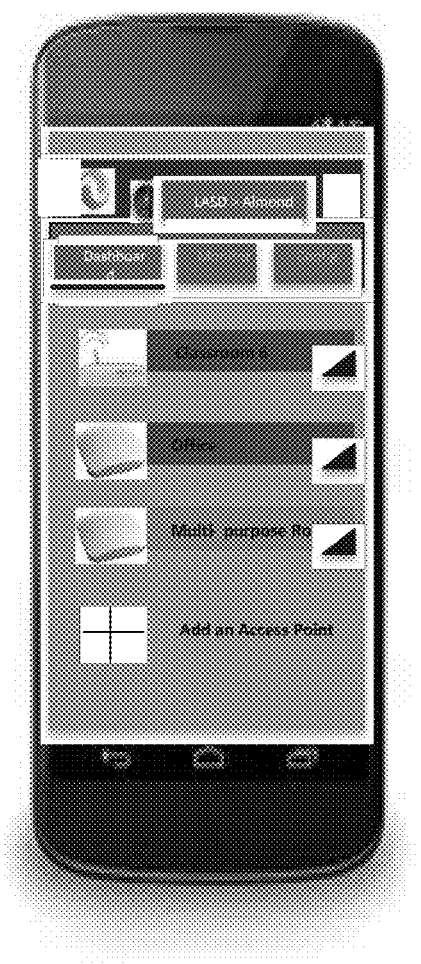
FIG. 10 illustrates an embodiment of a screenshot of the Wi-Fi service dashboard when the IT administrator navigates to a page displaying one of the three locations: Almond Elementary School.

At 706, the IT administrator logs onto the Wi-Fi service dashboard, selects the customer account and the location, and scans in or enters a unique identifier for the AP. Cloud-based AP agent may then send the customer account and location information together with the unique identifier of the AP to cloud-based Wi-Fi service manager 310. FIG. 8 illustrates an embodiment of a screenshot of the Wi-Fi service dashboard when the IT administrator is browsing at various customers of the VAR. As shown in FIG. 8, the screenshot shows five of the VAR's customers, including a company, two public school districts, and two hotels. FIG. 9 illustrates an embodiment of a screenshot of the Wi-Fi service dashboard when the IT administrator navigates to a page displaying the various locations of one of the VAR's customers, Los Altos School District (LASD). The locations include three elementary schools within the school district: Almond Elementary School, Oak Elementary School, and Santa Rita Elementary School. FIG. 10 illustrates an embodiment of a screenshot of the Wi-Fi service dashboard when the IT administrator navigates to a page displaying one of the three locations: Almond Elementary School. As shown in FIG. 10, Almond Elementary School has already installed APs in Classroom 6, the office, and the multi-purpose room, respectively. To install an additional AP at the current location, the IT administrator may select the icon "Add an Access Point," as shown in FIG. 10. The Wi-Fi service dashboard then prompts the IT administrator to scan in or enter a unique identifier of the AP.

Figure 11:
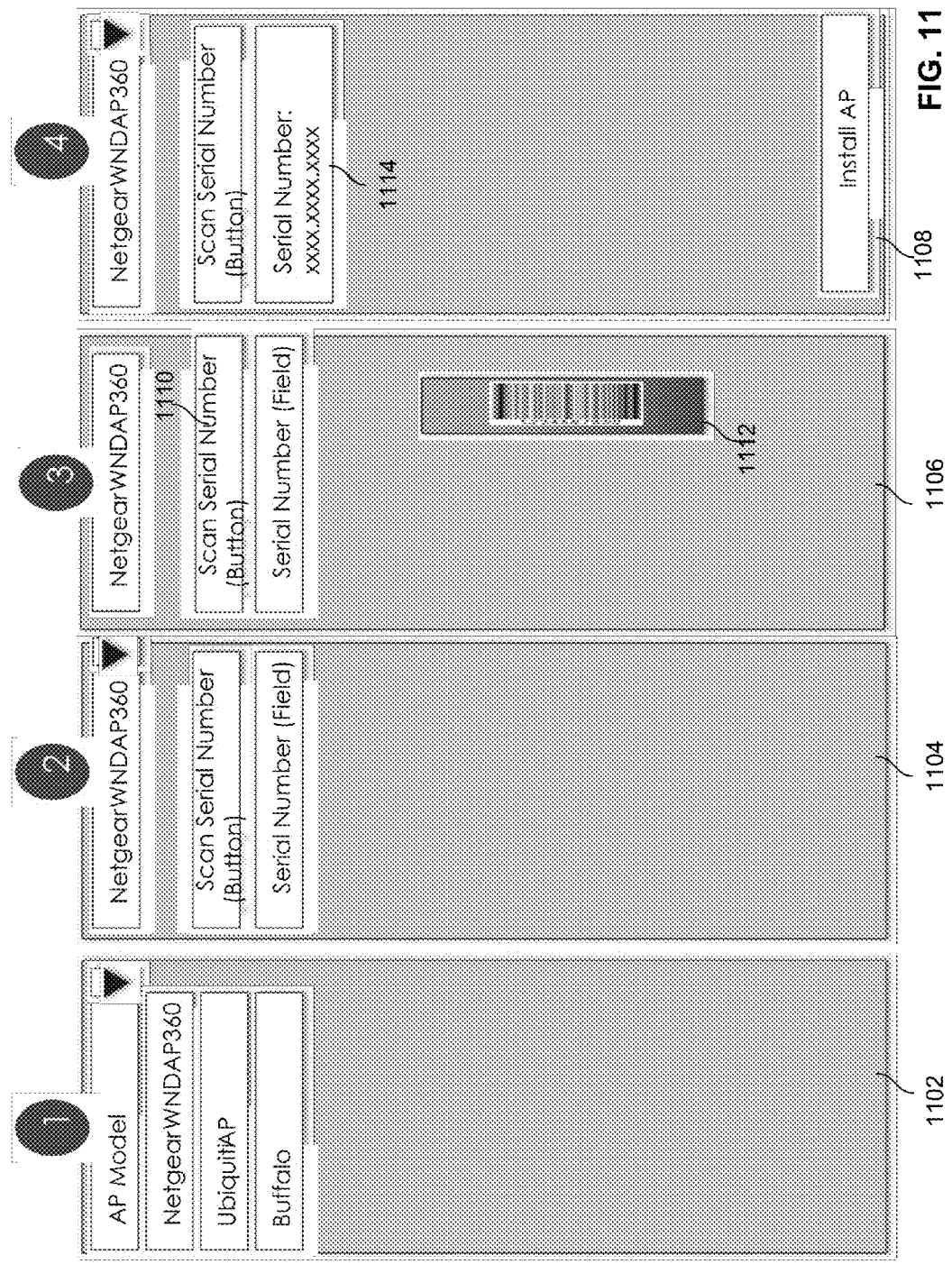
FIG. 11 illustrates an embodiment of a series of screenshots of the Wi-Fi service dashboard when the IT administrator is prompted to input the manufacturer's serial number as the unique identifier of the AP.

The unique identifier of the AP may be a Universal Product Code (UPC), the manufacturer's serial number (MSN), or the media access control (MAC) address of the AP. FIG. 11 illustrates an embodiment of a series of screenshots of the Wi-Fi service dashboard when the IT administrator is prompted to input the manufacturer's serial number as the unique identifier of the AP. In screenshot 1102, the IT administrator is prompted to select an AP model. In screenshot 1104, the IT administrator is prompted to either scan in the MSN number or enter the MSN number. In screenshot 1106, IT administrator presses the icon "Scan Serial Number" 1110, and a scan window 1112 is shown. After the IT administrator scans in the MSN number, screenshot 1108 displays the scanned MSN number in the serial number entry 1114.

Figure 12:
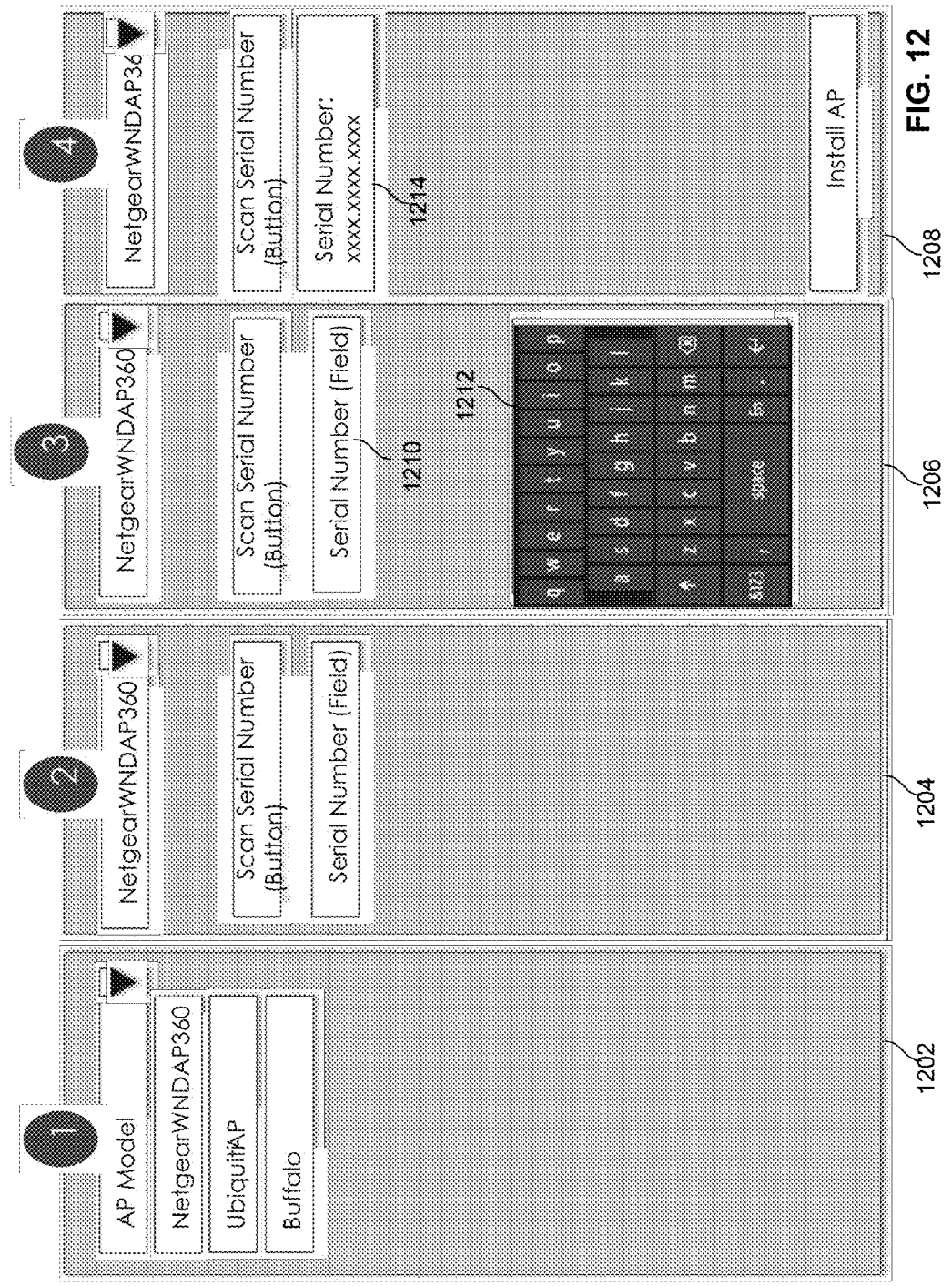
FIG. 12 illustrates a second embodiment of a series of screenshots of the Wi-Fi service dashboard when the IT administrator is prompted to input the manufacturer's serial number as the unique identifier of the AP.

FIG. 12 illustrates a second embodiment of a series of screenshots of the Wi-Fi service dashboard when the IT administrator is prompted to input the manufacturer's serial number as the unique identifier of the AP. In screenshot 1202, the IT administrator is prompted to select an AP model. In screenshot 1204, the IT administrator is prompted to either scan in the MSN number or enter the MSN number. In screenshot 1206, IT administrator presses the icon "Serial Number (Field)" 1210, and a virtual keyboard 1212 is shown. After the IT administrator types in the MSN number, screenshot 1208 displays the typed MSN number in the serial number entry 1214.

Figure 13:
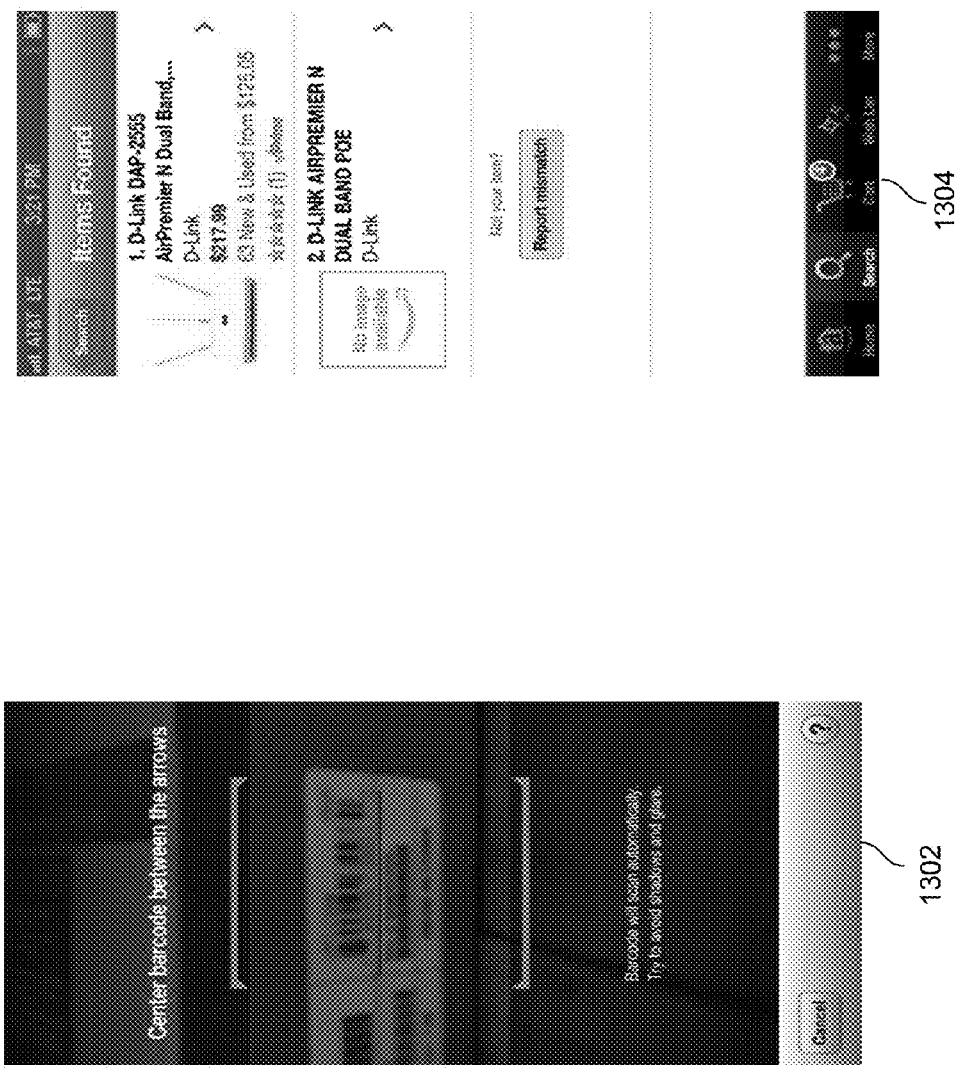
FIG. 13 illustrates an embodiment of a series of screenshots of the Wi-Fi service dashboard when the IT administrator is prompted to input the UPC label as the unique identifier of the AP.

FIG. 13 illustrates an embodiment of a series of screenshots of the Wi-Fi service dashboard when the IT administrator is prompted to input the UPC label as the unique identifier of the AP. In screenshot 1302, the IT administrator is prompted to center the barcode between the arrows, and the IT administrator is informed that the barcode will be scanned automatically. In screenshot 1304, Wi-Fi service dashboard confirms that it has read the barcode and shows the manufacturer, model number, and picture of the found AP product. The IT administrator may then confirm that the information is correct.

With continued reference to FIG. 7, at 708, cloud-based Wi-Fi service manager 310 matches the unique identifier of the AP previously stored as an entry in the database to the scanned-in or inputted unique identifier of the AP, and associates the entry with the location of the entity corresponding to the scanned-in or inputted unique identifier. Recall that at 704, the cloud-based AP agent has already reported to cloud-based Wi-Fi service manager 310, including sending the unique identifier of the AP (e.g., the Universal Product Code (UPC), the manufacturer's serial number (MSN), or the media access control (MAC) address of the AP) via the established communication session. The received unique identifier of the AP at 704 has been stored in a database as an entry, but it is not associated with any entity or any of its locations. At 708, cloud-based Wi-Fi service manager 310 has received the scanned or inputted unique identifier of the AP and may match it with the previously stored unique identifier of the AP, along with the location of the entity.

Figure 14:
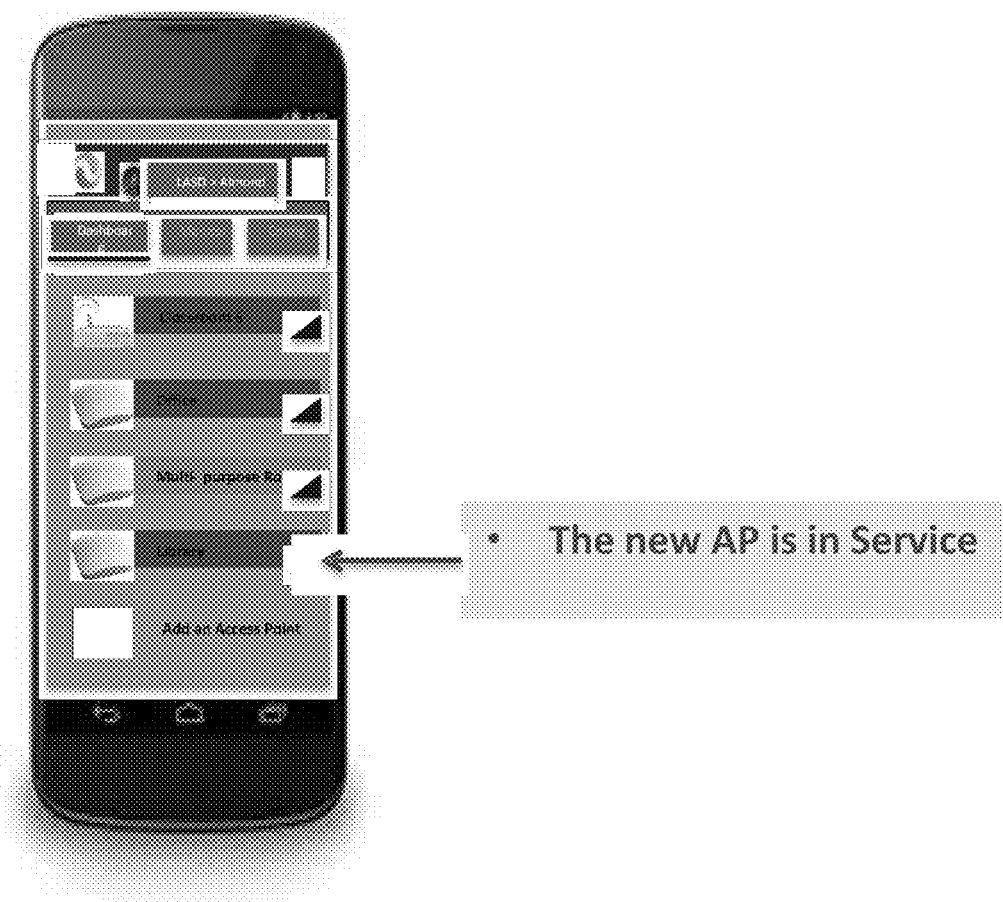
FIG. 14 illustrates that the AP is activated and in service.

At 710, cloud-based Wi-Fi service manager 310 pushes the configuration template to the AP via the XMPP communication session. The configuration template is selected based on the customer/entity and the location of the AP. When cloud-based AP agent receives the configuration template, it uses the configuration parameters to configure the AP and the AP is installed. FIG. 14 illustrates that the AP is activated and in service.

Figure 15:
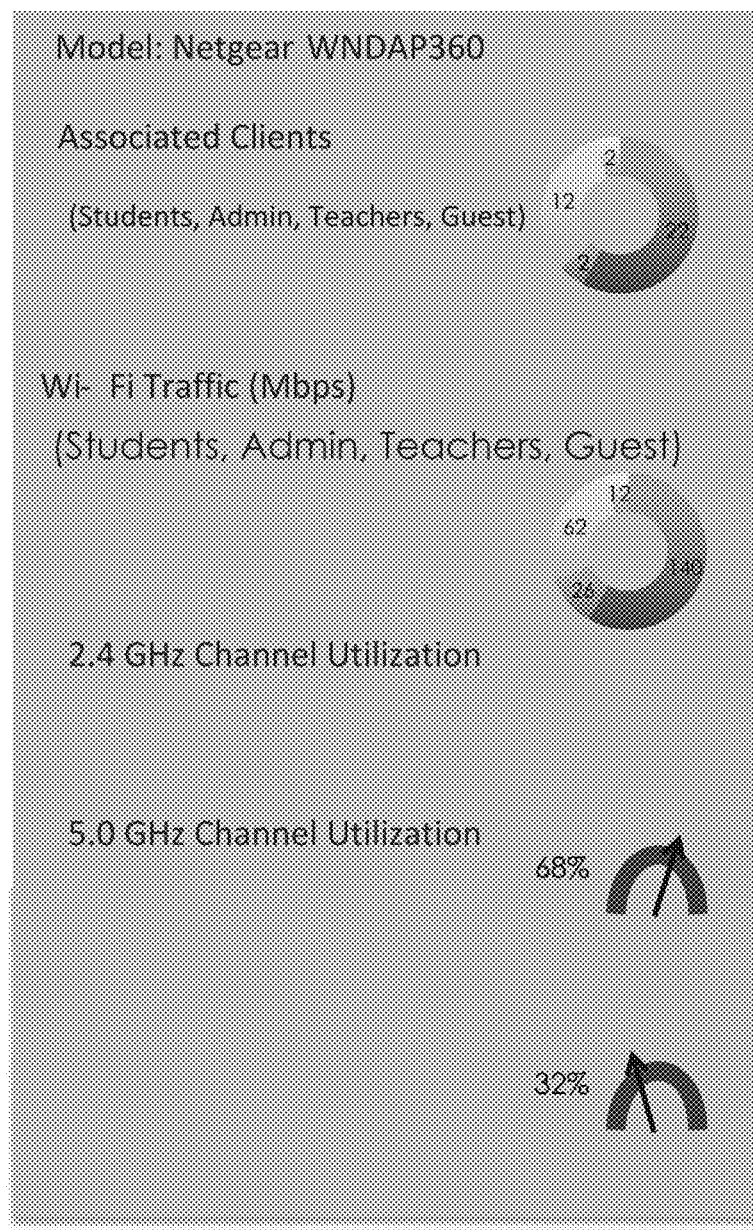
FIG. 15 shows an embodiment of a screenshot of the Wi-Fi service dashboard when an IT administrator monitors the status and performance of the AP.

With continued reference to FIG. 4, at 412, the IT administrator may monitor the AP using the Wi-Fi service dashboard. The Wi-Fi service dashboard may also alert the IT administrator when issues concerning the AP arise. FIG. 15 shows an embodiment of a screenshot of the Wi-Fi service dashboard when an IT administrator monitors the status and performance of the AP.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of activating and configuring an access point (AP) located at a location of a customer of an entity, comprising:
    receiving a first communication from the AP by a cloud-based Wi-Fi service manager, wherein the first communication includes a first unique identifier for the AP;
    receiving a second communication from an administrator of the entity by the cloud-based Wi-Fi service manager, wherein the second communication includes a second unique identifier for the AP and an identifier for the customer of the entity;
    associating the AP with the customer by the cloud-based Wi-Fi service manager;
    retrieving configuration information for the customer by the cloud-based Wi-Fi service manager; and
    sending the configuration information to the AP by the cloud-based Wi-Fi service manager, wherein the configuration information is used by the AP for configuration,
    wherein a cloud-based AP agent is installed on the AP, wherein the cloud-based AP agent establishes a communication session between the AP and the cloud-based Wi-Fi service manager, wherein the first communication and the configuration information are sent through the communication session, and
    wherein the cloud-based AP agent uses a firewall-friendly communication to establish the communication session between the AP and the cloud-based Wi-Fi service manager, the firewall-friendly communication allowing the configuration information sent from the cloud-based Wi-Fi service manager to the AP to pass through a firewall between the AP and the cloud-based Wi-Fi service manager.

2. The method of claim 1, wherein the cloud-based AP agent includes interfaces that interface with different hardware and firmware platforms corresponding to APs offered by different third party vendors.

3. The method of claim 2, wherein the cloud-based AP agent is divided into two or more layers, wherein some of the two or more layers is hardware and firmware dependent, and wherein some of the two or more layers is hardware and firmware independent.

4. The method of claim 1, further comprising:
    receiving a registration request from the administrator of the entity by the cloud-based Wi-Fi service manager, wherein the registration request registers the entity to use the services provided by the cloud-based Wi-Fi service manager.

5. The method of claim 1, further comprising:
    receiving a registration request from the administrator of the entity by the cloud-based Wi-Fi service manager, wherein the registration request registers the entity to resell the services provided by the cloud-based Wi-Fi service manager as a value-added reseller or a value-added distributor.

6. The method of claim 1, further comprising:
    receiving a request from the administrator of the entity by the cloud-based Wi-Fi service manager to create an account for the customer with one or more locations;
    receiving one or more configuration templates for the customer.

7. The method of claim 1, wherein the first communication is sent by the AP after the AP is powered up at the location and connected to a network.

8. The method of claim 1, wherein the first unique identifier for the AP and the second unique identifier for the AP are selected from the group consisting of: the Universal Product Code, the manufacturer's serial number, and the media access control address of the AP.

9. The method of claim 1, wherein the second communication is received through a user interface accessible by the administrator using a mobile device.

10. The method of claim 9, wherein the second unique identifier for the AP is scanned in by the administrator via the user interface.

11. The method of claim 9, wherein the identifier for the customer of the entity is entered by the administrator via the user interface.

12. The method of claim 1, wherein associating the AP with the customer comprises:
    determining that the first unique identifier for the AP and the second unique identifier for the AP match;
    determining that the AP belongs to the customer based on the match and the identifier for the customer.

13. The method of claim 1, wherein the second communication further includes an identifier for the location of the customer, and wherein associating the AP with the customer comprises:
    determining that the first unique identifier for the AP and the second unique identifier for the AP match;
    determining that the AP is installed at the location of the customer based on the match and the identifier for the location of the customer.

14. The method of claim 13, wherein the retrieving of the configuration information is based on the location of the customer.

15. A cloud-based Wi-Fi service manager for activating and configuring an access point (AP) located at a location of a customer of an entity, comprising:
- a user interface that is accessible by an application running on a mobile device; and
- a processor configured to:
  - receive a first communication from the AP, wherein the first communication includes a first unique identifier for the AP;
  - receive a second communication from an administrator of the entity through the user interface, wherein the second communication includes a second unique identifier for the AP and an identifier for the customer of the entity;
  - associate the AP with the customer;
  - retrieve configuration information for the customer; and
  - send the configuration information to the AP, wherein the configuration information is used by the AP for configuration; and
- a memory coupled to the processor and configured to provide the processor with instructions,
- wherein a cloud-based AP agent is installed on the AP, wherein the cloud-based AP agent establishes a communication session between the AP and the cloud-based Wi-Fi service manager, wherein the first communication and the configuration information are sent through the communication session, and
- wherein the cloud-based AP agent uses a firewall-friendly communication to establish the communication session between the AP and the cloud-based Wi-Fi service manager, the firewall-friendly communication allowing the configuration information sent from the cloud-based Wi-Fi service manager to the AP to pass through a firewall between the AP and the cloud-based Wi-Fi service manager.

16. The cloud-based Wi-Fi service manager of claim 15, wherein the cloud-based AP agent includes interfaces that interface with different hardware and firmware platforms corresponding to APs offered by different third party vendors.

17. The cloud-based Wi-Fi service manager of claim 16, wherein the cloud-based AP agent is divided into two or more layers, wherein some of the two or more layers is hardware and firmware dependent, and wherein some of the two or more layers is hardware and firmware independent.

18. The cloud-based Wi-Fi service manager of claim 15, wherein the processor is further configured to:
- receive a registration request from the administrator of the entity, wherein the registration request registers the entity to use the services provided by the cloud-based Wi-Fi service manager.

19. The cloud-based Wi-Fi service manager of claim 15, wherein the processor is further configured to:
- receive a registration request from the administrator of the entity, wherein the registration request registers the entity to resell the services provided by the cloud-based Wi-Fi service manager as a value-added reseller or a value-added distributor.

20. The cloud-based Wi-Fi service manager of claim 15, wherein the processor is further configured to:
- receive a request from the administrator of the entity to create an account for the customer with one or more locations;
- receive one or more configuration templates for the customer.

21. The cloud-based Wi-Fi service manager of claim 15, wherein the first communication is sent by the AP after the AP is powered up at the location and connected to a network.

22. The cloud-based Wi-Fi service manager of claim 15, wherein the first unique identifier for the AP and the second unique identifier for the AP are selected from the group consisting of: the Universal Product Code, the manufacturer's serial number, and the media access control address of the AP.

23. The cloud-based Wi-Fi service manager of claim 15, wherein the second unique identifier for the AP is scanned in by the administrator via the user interface.

24. The cloud-based Wi-Fi service manager of claim 15, wherein the identifier for the customer of the entity is entered by the administrator via the user interface.

25. The cloud-based Wi-Fi service manager of claim 15, wherein associating the AP with the customer comprises:
- determining that the first unique identifier for the AP and the second unique identifier for the AP match; and
- determining that the AP belongs to the customer based on the match and the identifier for the customer.

26. The cloud-based Wi-Fi service manager of claim 15, wherein the second communication further includes an identifier for the location of the customer, and wherein associating the AP with the customer comprises:
- determining that the first unique identifier for the AP and the second unique identifier for the AP match; and
- determining that the AP is installed at the location of the customer based on the match and the identifier for the location of the customer.

27. The cloud-based Wi-Fi service manager of claim 26, wherein the retrieving of the configuration information is based on the location of the customer.

28. A computer program product for activating and configuring an access point (AP) located at a location of a customer of an entity, the computer program product comprising a non-transitory computer readable medium having computer instructions stored thereon executed by a processor associated with a cloud-based Wi-Fi service manager to perform a method comprising:
- receiving a first communication from the AP, wherein the first communication includes a first unique identifier for the AP;
- receiving a second communication from an administrator of the entity, wherein the second communication includes a second unique identifier for the AP and an identifier for the customer of the entity;
- associating the AP with the customer;
- retrieving configuration information for the customer; and
- sending the configuration information to the AP, wherein the configuration information is used by the AP for configuration,
- wherein a cloud-based AP agent is installed on the AP, wherein the cloud-based AP agent establishes a communication session between the AP and the cloud-based Wi-Fi service manager, wherein the first communication and the configuration information are sent through the communication session, and
- wherein the cloud-based AP agent uses a firewall-friendly communication to establish the communication session between the AP and the cloud-based Wi-Fi service manager, the firewall-friendly communication allowing the configuration information sent from the cloud-based Wi-Fi service manager to the AP to pass through a firewall between the AP and the cloud-based Wi-Fi service manager.

* * * * *